(12) United States Patent
Angelo et al.

(10) Patent No.: US 9,645,947 B2
(45) Date of Patent: May 9, 2017

(54) BUNDLING FILE PERMISSIONS FOR SHARING FILES

(71) Applicant: Microsoft Corporation, Redmond, WA (US)

(72) Inventors: Mary Angelo, Seattle, WA (US); Brad Dodson, Seattle, WA (US); Emmanuel Miranda-Steiner, Seattle, WA (US); David Nichols, Redmond, WA (US); Daron Spektor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 431 days.

(21) Appl. No.: 13/901,559

(22) Filed: May 23, 2013

(65) Prior Publication Data

US 2014/0351541 A1    Nov. 27, 2014

(51) Int. Cl.
| G06F 17/30 | (2006.01) |
| G06F 7/00 | (2006.01) |
| G06F 12/14 | (2006.01) |
| G06F 9/46 | (2006.01) |
| G06F 21/62 | (2013.01) |

(52) U.S. Cl.
CPC ......... *G06F 12/1416* (2013.01); *G06F 9/468* (2013.01); *G06F 17/30165* (2013.01); *G06F 21/6209* (2013.01)

(58) Field of Classification Search
CPC .... H04L 63/10; H04L 63/101; G06F 21/6218
See application file for complete search history.

(56) References Cited

U.S. PATENT DOCUMENTS

| 6,684,254 B1 | 1/2004 | Dutta |
| 7,020,774 B1 | 3/2006 | Cornuejols et al. |
| 7,536,386 B2 | 5/2009 | Samji et al. |

(Continued)

FOREIGN PATENT DOCUMENTS

WO    2010/031413 A1    3/2011

OTHER PUBLICATIONS

Jujjuri, et al., "VirtFS—A Virtualization Aware File System Pass-Through", Retrieved at <<http://www.kernel.org/doc/ols/2010/ols2010-pages-109-120.pdf>>, In Proceedings of the Ottawa Linux Symposium, Jul. 13, 2010, pp. 14.

(Continued)

*Primary Examiner* — Jeffrey A Burke (57) ABSTRACT

When files or other objects are to be shared, a storage system creates a bundle object that identifies the objects to be shared, and the permissions associated with objects in that bundle object. Each object is marked as being associated with a bundle object. When the object is accessed, the storage system determines if the object is associated with a bundle object. The bundle object in turn is accessed to determine the permissions to be associated with that object for the entity accessing the object. Files and other objects can be shared without copying or moving them. Any collection of files or other objects, however selected or identified, can be shared through this mechanism. Using this mechanism, a user can select several files, and then share those files in one operation without copying or moving those files or creating a new folder for those files.

20 Claims, 9 Drawing Sheets

(56) References Cited

U.S. PATENT DOCUMENTS

| | | | |
|---|---|---|---|
| 7,580,933 B2 | 8/2009 | Johnson et al. | |
| 7,627,652 B1* | 12/2009 | Commons | H04L 67/1097 709/213 |
| 7,653,733 B2 | 1/2010 | Beyda | |
| 7,783,665 B1* | 8/2010 | Tormasov et al. | 707/783 |
| 7,979,369 B2 | 7/2011 | Grenier et al. | |
| 7,991,957 B2 | 8/2011 | Mercer | |
| 8,117,226 B2 | 2/2012 | Samji et al. | |
| 8,312,485 B2 | 11/2012 | Robson et al. | |
| 8,380,632 B2 | 2/2013 | Dicke et al. | |
| 8,434,126 B1 | 4/2013 | Schepis et al. | |
| 8,504,653 B1 | 8/2013 | Commons et al. | |
| 8,769,300 B2* | 7/2014 | Catrein | G06F 21/10 713/153 |
| 9,049,176 B2 | 6/2015 | Ferdowsi et al. | |
| 9,288,283 B2 | 3/2016 | Alten | |
| 9,294,485 B2 | 3/2016 | Allain et al. | |
| 9,325,571 B2 | 4/2016 | Chen | |
| 2001/0041989 A1 | 11/2001 | Vilcauskas et al. | |
| 2003/0126267 A1 | 7/2003 | Gutta et al. | |
| 2005/0021780 A1 | 1/2005 | Beyda | |
| 2005/0132220 A1 | 6/2005 | Chang et al. | |
| 2005/0183143 A1 | 8/2005 | Anderholm et al. | |
| 2005/0198031 A1 | 9/2005 | Pezaris et al. | |
| 2008/0052514 A1 | 2/2008 | Nakae | |
| 2008/0104393 A1* | 5/2008 | Glasser et al. | 713/165 |
| 2008/0133445 A1 | 6/2008 | Pennington | |
| 2008/0168490 A1 | 7/2008 | Yu | |
| 2009/0012965 A1 | 1/2009 | Franken | |
| 2009/0055915 A1 | 2/2009 | Piliouras | |
| 2009/0138808 A1* | 5/2009 | Moromisato et al. | 715/758 |
| 2010/0037324 A1 | 2/2010 | Grant et al. | |
| 2010/0146269 A1 | 6/2010 | Baskaran | |
| 2011/0078197 A1* | 3/2011 | Zurko et al. | 707/783 |
| 2011/0149809 A1 | 6/2011 | Narayanaswamy | |
| 2012/0005159 A1 | 1/2012 | Wang et al. | |
| 2012/0157049 A1 | 6/2012 | Eliovits et al. | |
| 2012/0221627 A1 | 8/2012 | Sainio et al. | |
| 2012/0246732 A1 | 9/2012 | Burton | |
| 2012/0254304 A1 | 10/2012 | Anbalagan et al. | |
| 2012/0311039 A1 | 12/2012 | Ogawa | |
| 2013/0031643 A1 | 1/2013 | Rogel et al. | |
| 2013/0047260 A1 | 2/2013 | Hoefel et al. | |
| 2013/0054477 A1 | 2/2013 | Steele | |
| 2013/0081141 A1 | 3/2013 | Anurag | |
| 2013/0117131 A1 | 5/2013 | Robinson et al. | |
| 2013/0117190 A1 | 5/2013 | Wald | |
| 2013/0275398 A1* | 10/2013 | Dorman et al. | 707/693 |
| 2014/0143542 A1* | 5/2014 | Chang | 713/165 |
| 2014/0149461 A1* | 5/2014 | Wijayaratne et al. | 707/785 |
| 2014/0230018 A1 | 8/2014 | Anantharaman | |
| 2014/0351541 A1 | 11/2014 | Angelo et al. | |
| 2014/0351957 A1 | 11/2014 | Zacher et al. | |

OTHER PUBLICATIONS

Shami, et al., "Browse and Discover: Social File Sharing in the Enterprise", Retrieved at <<http://watsonweb.watson.ibm.com/cambridge/Technical_Reports/2011/Browse%20and%20Discover%20CSCW%202011.pdf>>, In ACM Conference on Computer Supported Cooperative Work, Mar. 19, 2011, pp. 10.

Yu, et al., "Achieving Secure, Scalable, and Fine-grained Data Access Control in Cloud Computing", Retrieved at <<http://makefinalyearproject.com/dotnet_Base/89.pdf>>, In Proceedings of the 29th Conference on Information Communications, Mar. 14, 2010, pp. 9.

Suhendra, Vivy., "A Survey on Access Control Deployment", Retrieved at <<http://www1.i2r.a-star.edu.sg/~vsuhendra/2011-sectech.pdf>>, In Communications in Computer and Information Science, Dec. 8, 2011, pp. 10.

"International Search Report & Written Opinion for PCT Application No. PCT/US2013/058362", Mailed Date: Jan. 30, 2014, Filed Date: Sep. 6, 2013, 9 pages.

"Content Blocking", Retrieved Date: Jan. 17, 2013, Available at: http://help.opera.com/Mac/11.60/en/contentblock.html.

"Fiickr Safety Guide", Retrieved Date: Jan. 17, 2013, Available at: http://info.yahoo.com/safely/us/yahoo/flickr/.

"How to Report Things", Published Date: Jan. 8, 2013, Available at: http://web.archive.org/web/20130108122508/https://www.facebook.com/help/181495968648557/.

"Final Office Action Received for U.S. Appl. No. 13/901,545", Mailed Date: May 22, 2015, 13 Pages.

"Non-Final Office Action Received for U.S. Appl. No. 13/901,545", Mailed Date: Sep. 29, 2014, 9 Pages.

"Non-Final Office Action Received for U.S. Appl. No. 14/082,044", Mailed Date: Jul. 2, 2015, 28 pages.

Surur, "Watch What You Store on SkyDrive—You may Lose Your Microsoft Life", Published Date: Jul. 19, 2012, Available at: http://wmpoweruser.com/watch-what-you-store-on-skydriveyou-may-lose-your-microsoft-life/.

"Autonomy's Virage Automates Copyright Infringement Detection for Online Video", Retrieved From <<https://web.archive.org/web/20070711195236/http://autonomy.com/content/News/Releases/2007/0405a.en.html, Apr. 5, 2007 2 Pages.

"CyberScan (Online IP Infringement Detection Service)", Retrieved From <<http://www.hcltech.com//sites/default/files/CyberScan.pdf>>, Jul. 2011, 17 Pages.

"Final Office Action Issued in U.S. Appl. No. 13/901,545", Mailed Date: Dec. 17, 2015, 17 Pages.

"Final Office Action Issued in U.S. Appl. No. 14/082,044", Mailed Date: Dec. 9, 2015, 34 Pages.

Agrawal, Swati, "Detecting Copyright Infringement on You Tube Videos using You Tube Metadata", In Departmen of Computer Science and Engineering, MTech Theses, 2013, Apr. 2, 2013, 46 Pages.

"Final Office Action Issued in U.S. Appl. No. 13/901,545", Mailed Date: Aug. 15, 2016, 25 Pages.

"Non Final Office Action Issued in U.S. Appl. No. 14/082,044", Mailed Date: Jul. 13, 2016, 22 Pages.

* cited by examiner

BUNDLING FILE PERMISSIONS FOR SHARING FILES

BACKGROUND

People commonly store files, especially photos and documents, on network-based shared storage services. A common use of such storage services is for a user to share files with other users.

Sharing of files generally involves a user defining a folder for the files to be shared. Then the user authorizes one or more other users to access the folder. Files generally are either copied or moved into the folder. If a file is shared in different ways with different users, then the file is generally copied to multiple folders. For example, a user may share a photo and a document with a first user, but then the photo and a different photo, but not the document, with a second user. In such a case, the photo and document are placed in a first folder to which the first user is granted access. The photo and the other photo are placed in a second folder to which the second user is granted access. Alternatively the photo that is shared with both users can be placed in a separate folder to which both the first and second user are granted access.

Such tracking of folders, and copying and moving of files, makes for a difficult and cumbersome user experience. Also, sharing files in this way typically results in multiple different copies of files, thus unnecessarily consuming more storage.

SUMMARY

This Summary introduces selected concepts in simplified form that are further described below in the Detailed Description. This Summary is intended neither to identify key or essential features of the claimed subject matter, nor to limit the scope of the claimed subject matter.

A desirable end user experience for sharing files involves allowing the user to select several files, and then to share those files in one operation without copying or moving those files and/or creating a new folder for those files.

When files or other objects are to be shared, a storage system creates a bundle object that identifies the files or other objects to be shared, and the permissions associated with objects in that bundle object. Each object is marked as being associated with a bundle object. When the object is accessed by an entity, such as a user or a process of system, the storage system determines if the object is associated with a bundle object. The bundle object in turn is accessed to determine the permissions to be associated with that object for the entity accessing the object. Files and other objects can be shared without copying or moving them. Any collection of files or other objects, however selected or identified, can be shared through this mechanism.

Accordingly, in one aspect, an indication of objects to be shared is received into memory. A bundle object is generated. Data is stored indicating that the shared objects are associated with the bundle object. Permissions for accessing the shared objects are stored with the bundle object. The permissions can indicate entities permitted to access the shared objects. If the bundle object is a file system object, the bundle object can be created outside of a file system name space for a user. In response to an entity accessing an object associated with a bundle object, the permissions for the bundled object are accessed. Whether the entity has permission to access the object is determined in part using the permissions for the bundle object. A user interface can be presented to allow a user to share selected file objects without copying or moving the selected file objects. The user interface can indicate, for a user, file objects shared by that user, bundle objects associated with the user and file objects within the bundle objects. Using bundle objects, objects shared with an entity by other entities can be readily identified.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a shared storage service with bundled file permissions can be implemented.

Figure 1:
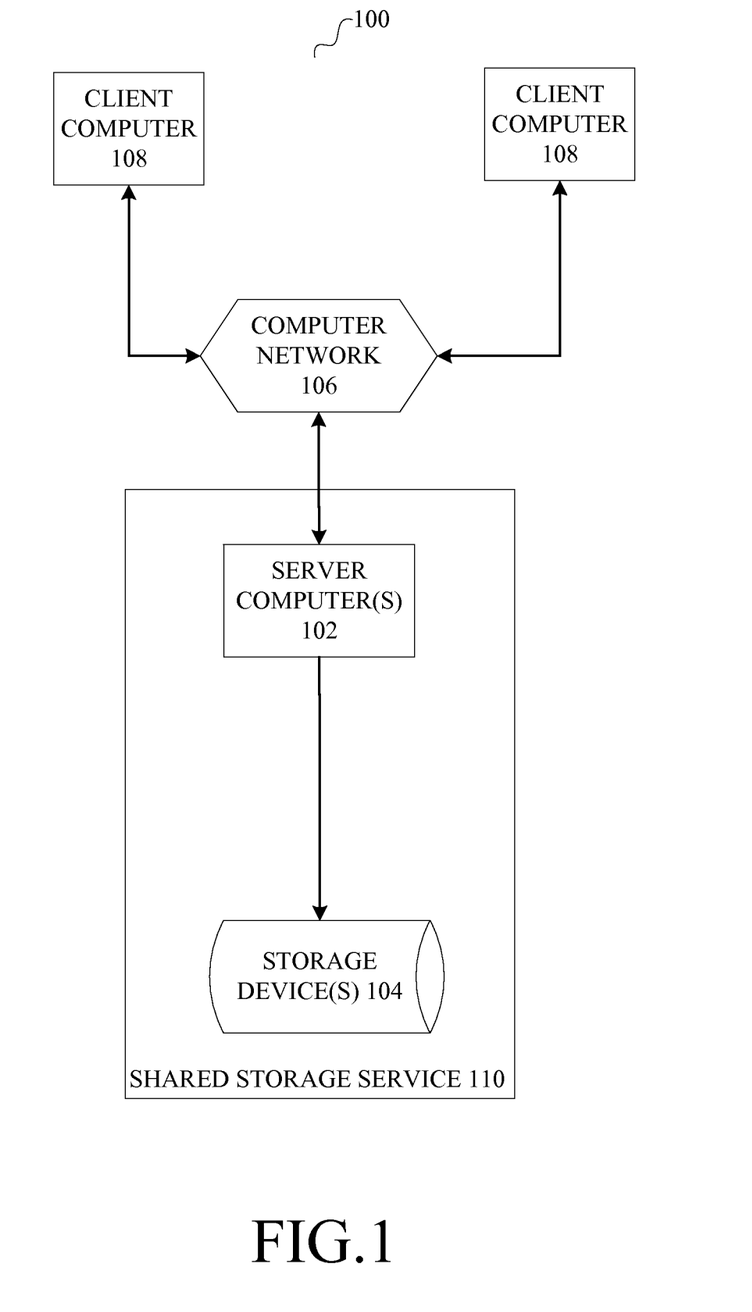
FIG. 1 is a block diagram of an example operating environment in which a shared storage service with bundled file permissions can be implemented.

Referring to FIG. 1, a system 100 includes one or more server computers 102 that manage access to files and other objects stored on one or more storage devices 104. The one or more server computers 102 typically are implemented using conventional server computers, such as described in more detail below in connection with FIG. 9, and are designed to support large loads of access and storage and to provide high availability. The combination of server computers 102 and storage devices 104 provide a shared storage service 110.

The one or more server computers are accessible over a computer network 106, such as the Internet, to which one or more client computers 108 are connected. The client computers communicate with the server computers to access files or other objects stored on the storage devices 104, by storing, reading, writing, updating, deleting or otherwise managing such files or other objects.

The client computers can be any type of end user computing device that can access the computer network 106, such as a variety of devices described below in connection with FIG. 9. For example, such access can be provided using a browser application that communicates with a server computer using the HTTP and similar protocols over the Internet or other TCP/IP based computer networks.

The one or more server computers are programmed to provide a shared storage service for end users, each of which has an account with a shared storage service. The shared storage service, for example, can implement a file system through which file objects are accessed. Each file object is associated with an entity, such as a system process, device, application or a user, and has permissions specifying the access rights that each entity has for that file object. For example, a user may share photos with other users, with system processes or with devices that use such photos, such as a digital picture frame displaying a slideshow of pictures shared with it. Entities can access their own file objects, and file objects shared with them by others, after authentication with the shared storage service. The shared storage service, as another example, can implement other techniques for storage of data, such as a database, in which objects are stored. In a manner similar to a file system, such other objects can have associated access permissions. Whether in a file system or other form of data storage system, such file objects or other objects, are called "storage objects" or simply "objects" herein.

As described in more detail below, when one or more storage objects are to be shared, the system creates a new object, called a bundle object or bundle, which stores data identifying the storage objects in the bundle. A bundle itself can be a storage object. If implemented in a file system, this bundle object can be a file system object and is stored outside of the file system name space for the entity sharing the objects in the bundle. The bundle object has an identifier, and each object in the bundle is associated with the bundle identifier. The bundle has permissions associated with it, for each entity having access to the bundle. The storage objects in the bundle inherit the permissions associated with the bundle(s) in which they are included. As described in more detail below, such a bundle allows a user to quickly specify a set of objects, and share them, without having to create new folders, or to copy files or to move files.

Given this context, an example implementation will be described in more detail in connection with FIGS. 2-8. This example implementation is directed to a file system and sharing access to file system objects in a file system using a bundle object that is itself a file system object in the file system. It should be understood that other implementations are possible, including using other forms of data storage to represent bundles, such as a database, and applying bundles to other forms of storage objects.

Figure 2:
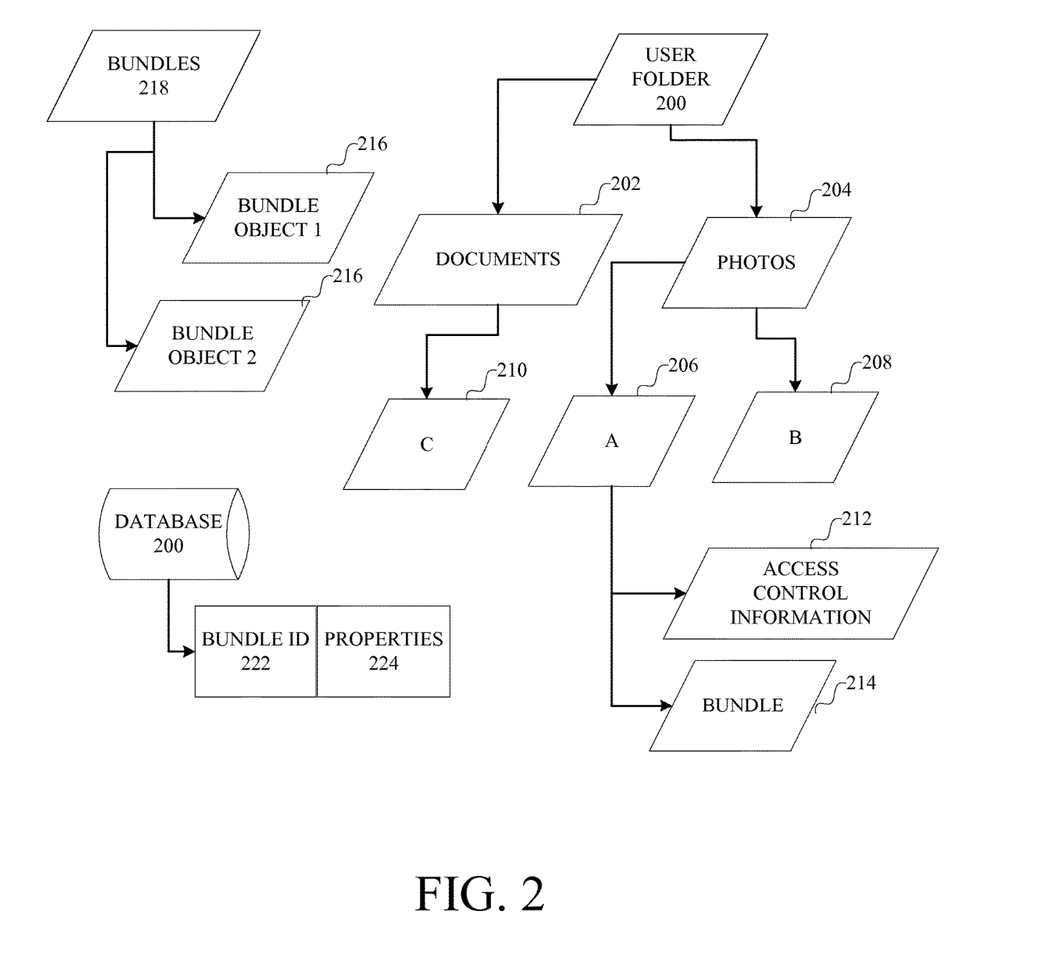
FIG. 2 is a block diagram illustrating an example implementation of how a file system for the shared storage service stores information about files.

FIG. 2 is a block diagram illustrating an example implementation of a shared storage service that uses a file system to store files and other file system objects, and in which bundles are created as file system objects. Other implementations for storing data not using a file system are possible. An advantage of creating bundles as a form of file system object is that bundles in turn can be shared in the same manner as other file system objects.

In FIG. 2, each user has a user folder 200, which is a file object that stores a collection of other file objects, such as files and other folders. Shown in the example of FIG. 2 are two folders 202 and 204, one for documents and one for photos. The set of folders that a user has access to is called the file system name space for that user. It should be understood that this is merely an example, and the invention is not limited to having specific folders. In this example, the photos folder includes a photo "a" (206) and a photo "b" (208), and documents folder includes a file "c" (210).

Each file system object has associated access control information 212, also called permissions. The permissions include an indication of a user or other entity that is permitted to access the file object, and the nature of those permissions (read-only, read/write, etc.). Such permissions can be different for different entities, and can be different for different parts of a file system object, e.g., different file streams of a file. The manner in which such permissions are specified, stored and formatted varies among different file systems.

In addition to conventional permissions, each file object also includes an indication 214 of whether the file object is part of a bundle, wherein a bundle is a collection of one or more file objects that has been shared by one user with one or more other users. A bundle defines additional permissions for shared file objects. For example, the data structure representing a file object can include a field indicating whether the file object is in a bundle, an optionally the identifier(s) of the bundle(s) including the file object.

As noted above, in this example implementation, bundles are file system objects 216 that are defined outside of the file system name space of a user. For example, a system level folder 218 can be used to collect bundles 216. Data about a bundle can be stored, for example, in a database, such as a relational database, as shown at 220. The database can store, for each bundle, its identifier 222 and related information 224. Such information can include, but is not limited to, the date it was created, the user that created it, a name, a size for each file object in the bundle, the file objects included in the bundle and permissions associated with the bundle that are inherited by the objects in the bundle. Using a database to store data about bundles allows a file object to be associated with multiple bundles, and entities to be associated with different bundles, in a manner that allows efficient identification of the bundles containing a file object and bundles associated with different entities.

Figure 3:
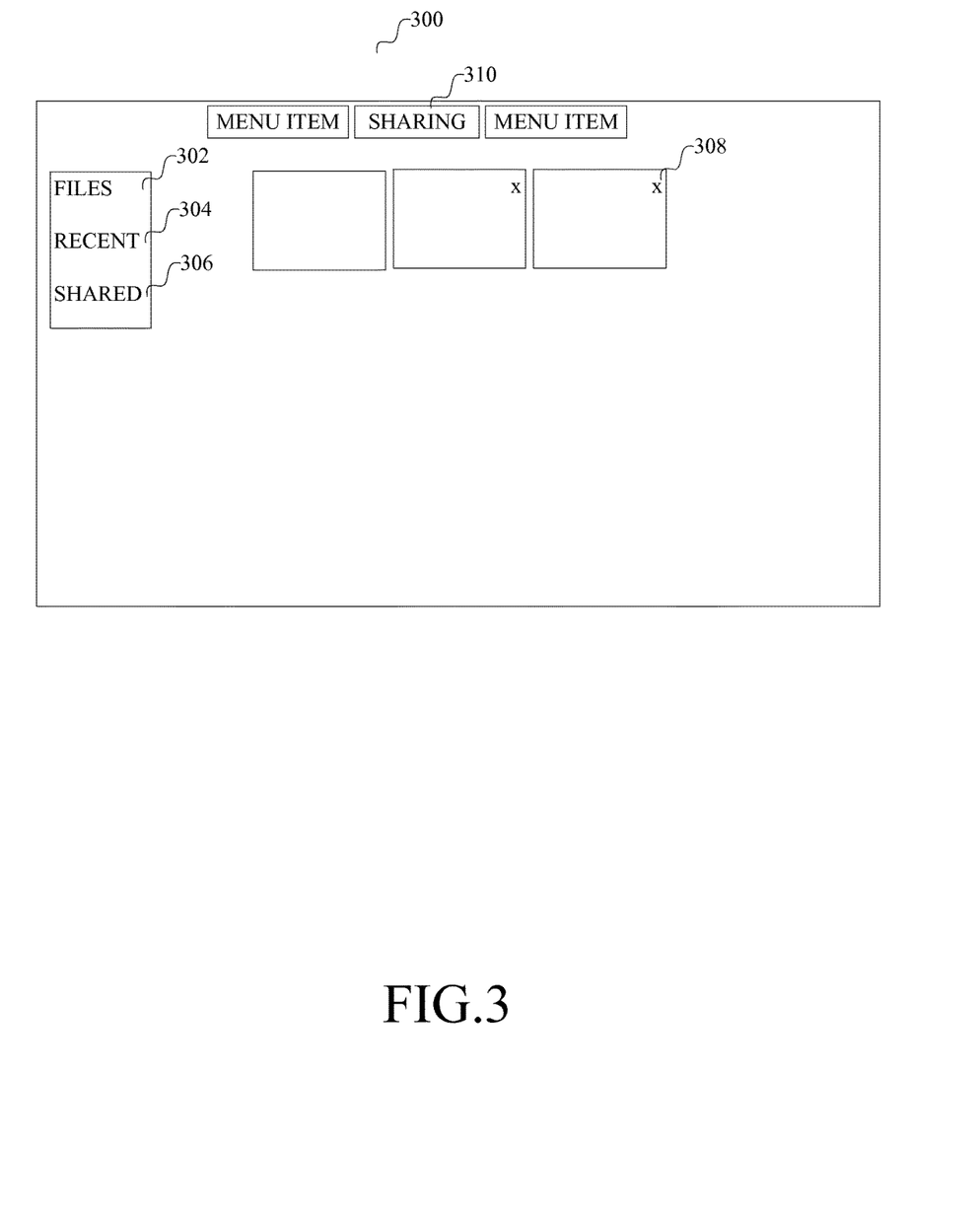
FIG. 3 is an illustration of an example graphical user interface for a shared storage service allowing sharing of file objects among users.
Figure 4:
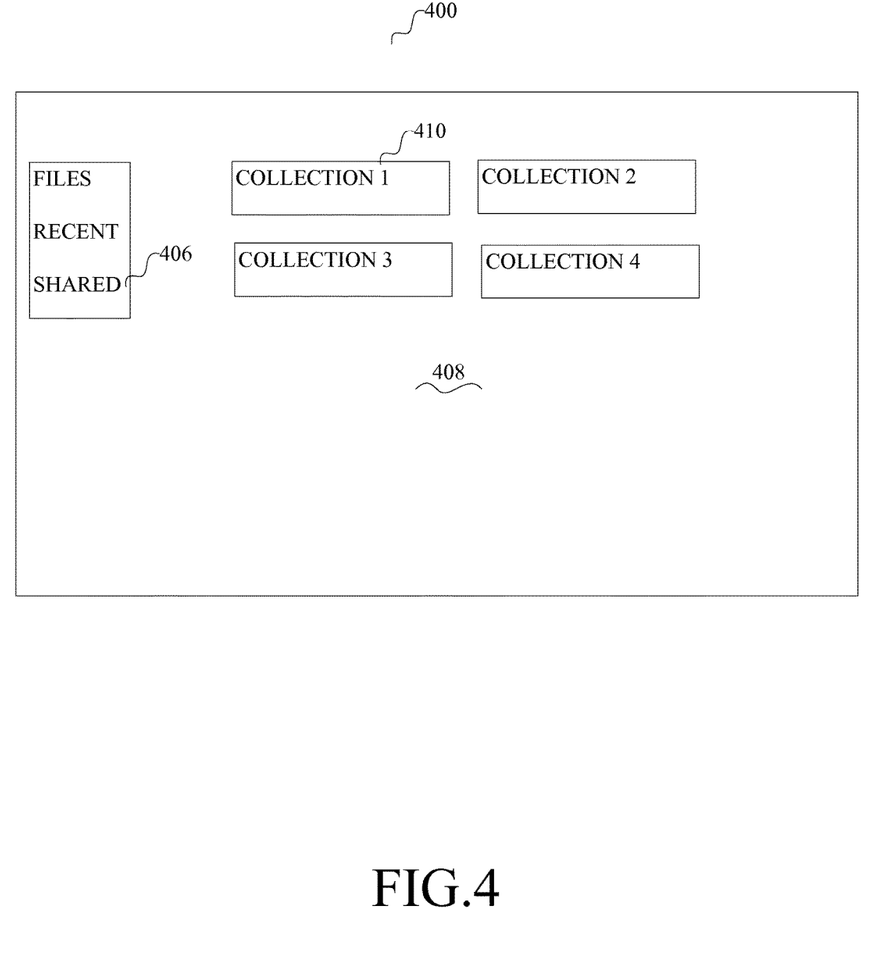
FIG. 4 is an illustration of an example graphical user interface for shared file objects.

Referring now to FIGS. 3-4, an example graphical user interface for a shared storage service allowing sharing of users' files will now be described. It should be understood that these are merely examples, and that there are other ways files or other objects can be shared among users or other entities.

This example user interface 300 can be part of, for example, an application on the client computer or viewed in a browser application on the client computer. In this example, the user interface indicates three top level collections of objects: files 302, recent files 304 (a list of file recently accessed by the user) and shared files 306. When a user selects one of these three tabs, indications of the file objects within the selected collection are shown in a file pane 308. A user can select one or more files indicated in the file pane, and can navigate among folders and other file objects as is conventional in graphical user interfaces in most file systems. After selecting one or more files, to share the files the user manipulates the "sharing" menu 310 to invoke an input interface that allows parameters for the sharing to be input by the user.

After a user shares files 406, the file pane can show collections, e.g., 410, of files shared with others by the user, and collections of files shared by others with the user, as shown in FIG. 4. In FIG. 4, the file pane 408 shows each collection shared by the user. In response to the user further manipulating the representation of one of the collections, further details of the collection can be displayed, such as the files contained within it.

While the examples above describe selection of each file object by user manipulation of graphical representation of those file objects, there are a variety of other ways in which objects can be selected to be shared.

For example, a user or a system process can define a bundle based on a query, algorithm or indirect user gesture. For example, a query specifying characteristics of objects can be used to select the objects in a bundle. As an example, a user may specify that all photos taken on a specific day can be used to select the objects.

The examples above also describe an example implementation where the data for a bundle stores identifiers of the objects contained in the bundle, and each object stores an identifier indicating the bundle(s) in which it is a member. In other implementations, the data stored in the bundle can be any data that can be used to identify the objects in the bundle, such as a query. Thus the data stored in the bundle may be evaluated to derive the identifiers for the objects in the bundle. In such an implementation, when resolving permissions for an object, the bundles for the entity or entities having permissions to share the object can be evaluated to determine if the object is in a bundle that the entity has shared.

Referring to FIGS. 5-8, flowcharts of example implementations of operations using bundled file permissions will now be described.

Figure 5:
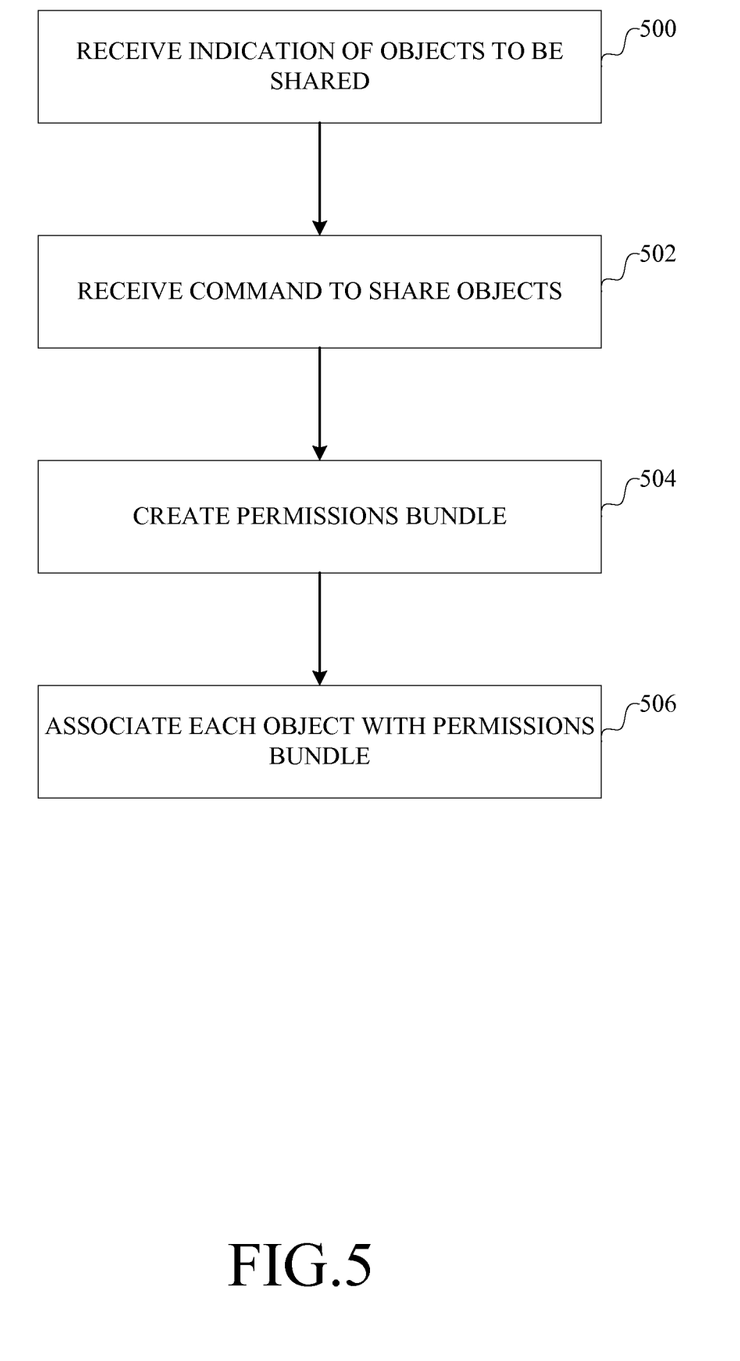
FIG. 5 is a flow chart an example implementation of sharing file objects.

To share files, the system receives 500 an indication of files to be shared, such as by a user selecting multiple files. The system then receives 502 a command to share the indicated files, along with an indication of one or more entities with whom the selected files are to be shared and an identifier, e.g., a name, for the collection. A bundle for the collection is then created 504. Each object in the collection is then associated 506 with the bundle.

Figure 6:
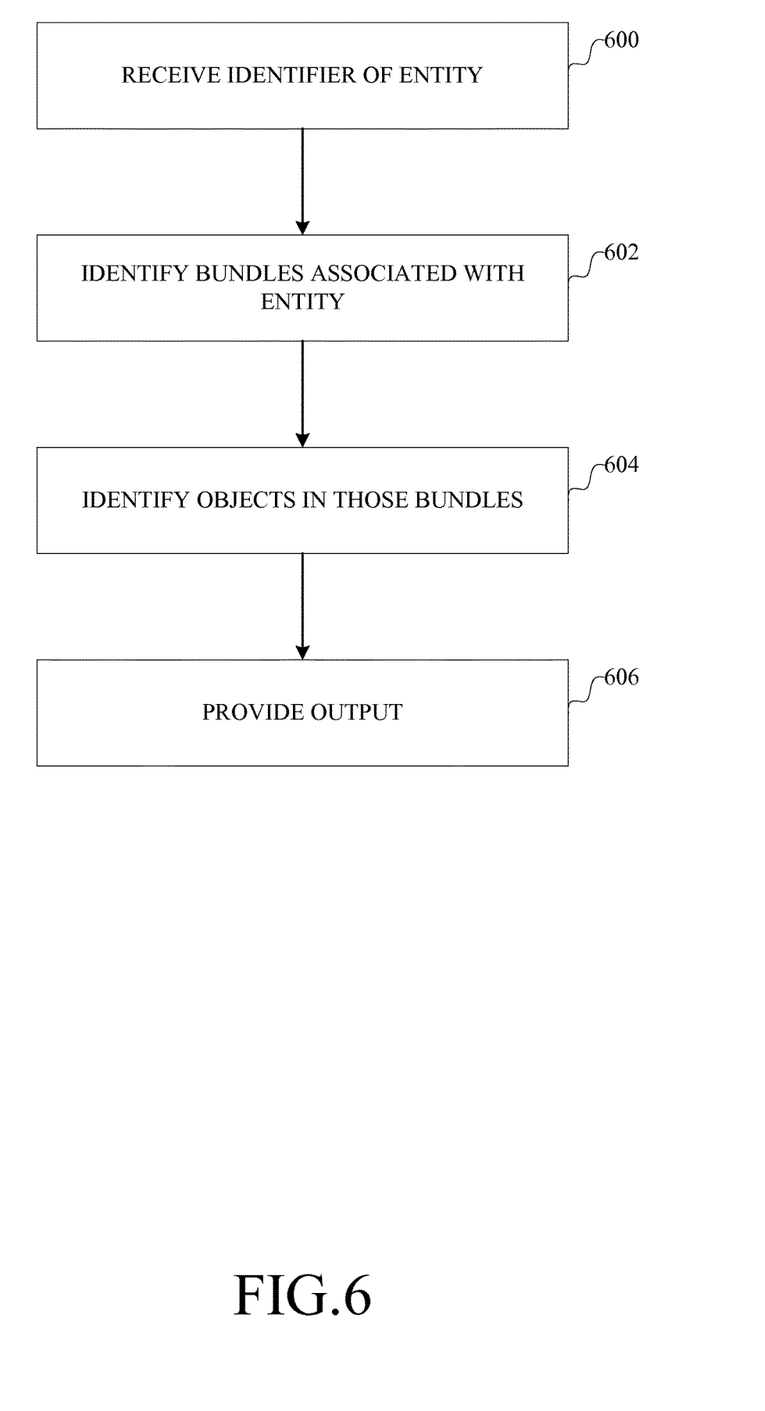
FIG. 6 is a flow chart an example implementation of identifying shared file objects for a user.

To identify bundles associated with an entity, a process such as described in connection with FIG. 6 can be used. An identifier of the entity is received 600 by the system. The data about bundles is accessed and searched 602 to identify bundles associated with the identifier. Such a search can be for bundles shared with an entity, by an entity or both. Objects within those bundles also are identified 604. Information about the bundles, and the objects within them, can then be provided 606 as an output, such as by being presented to a user.

Figure 7:
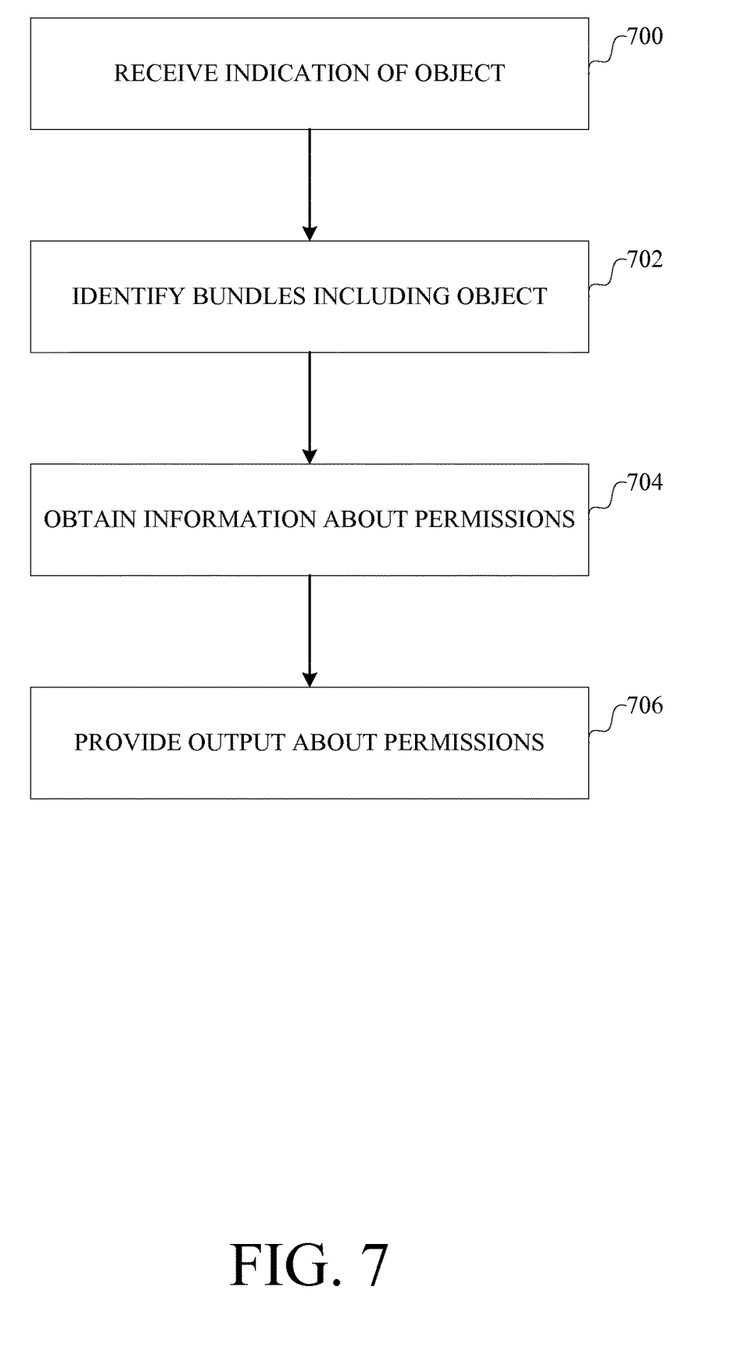
FIG. 7 is a flow chart an example implementation of identifying permissions associated with a shared file object.

It also is possible to show, for a given object, whether a bundle or storage object, such as a file object, file, file stream, or folder, or other object, which entities have permissions, and what those permissions are. As shown in FIG. 7, an indication of an object is received 700. The data about bundles is accessed and searched 702 for bundles with which the selected object is associated. Information about the permissions for the bundles are then retrieved 704. This information is then provided as an output 706, such as by being presented to the user, to indicate the entities having permissions, and what those permissions are.

Figure 8:
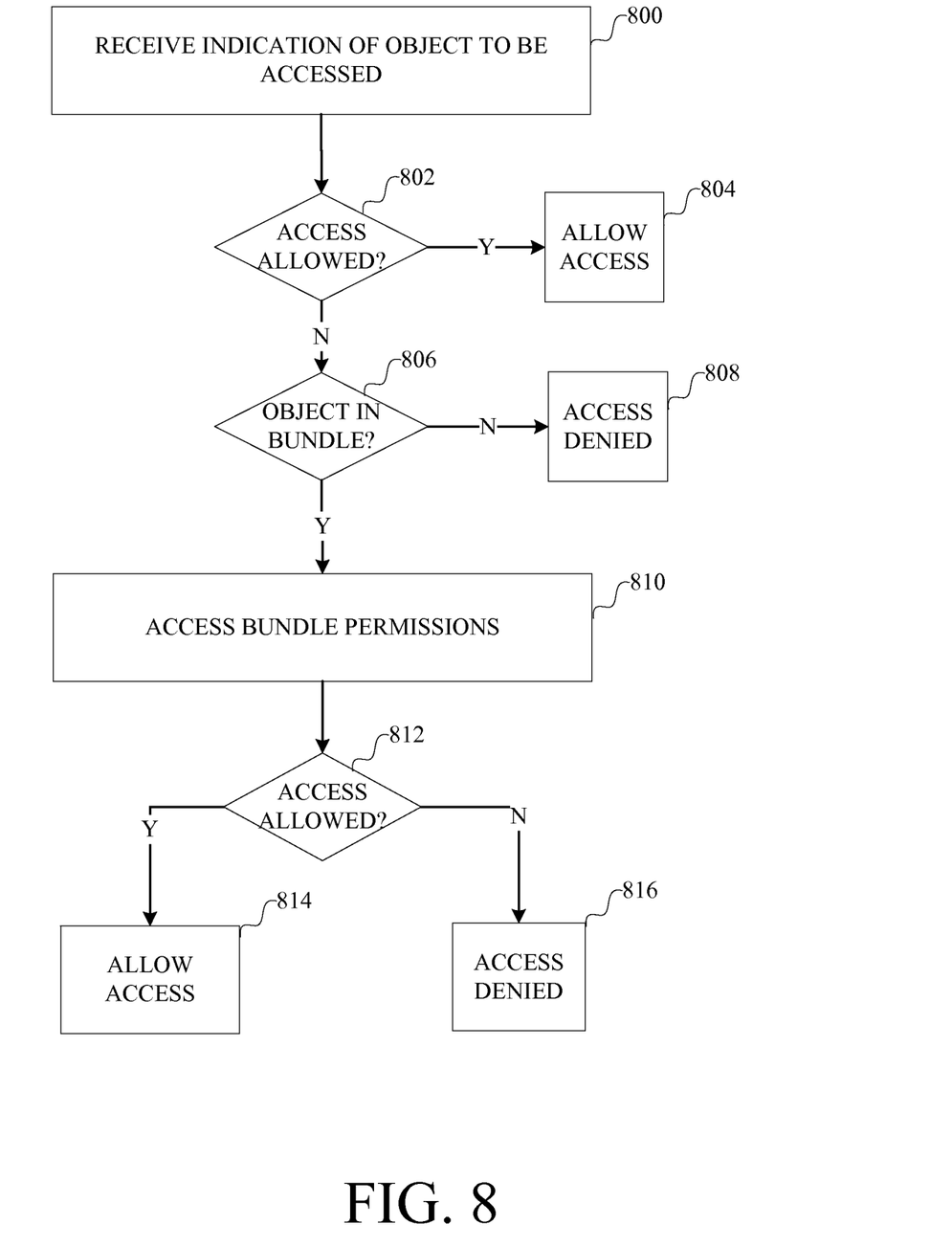
FIG. 8 is a flow chart an example implementation of authorizing access to a file object.

Referring now to FIG. 8, access to a shared object will now be described. When an entity attempts to access an object, the system receives 800 an indication of the object. The system determines 802 whether the permissions associated with that object permit the entity to access the object. If yes, then the access is allowed 804. Otherwise, it is determined at 806 whether the object is in any bundle. If the object is not in a bundle, then access is denied 808. If the object is in a bundle, then the bundle permissions are accessed 810. If the bundle permissions allow the entity to access the object, as determined at 812, then the access is allowed 814; otherwise the access is denied 816.

A variety of other operations also can be provided to add and remove entities to and from a bundle, add and remove objects to and from a bundle, and change the permissions associated with an entity, object or bundle. By being able to identify entities and permissions associated with objects, and the bundles containing these objects, as described above, additional code and operations can be provided to modify these values.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 9:
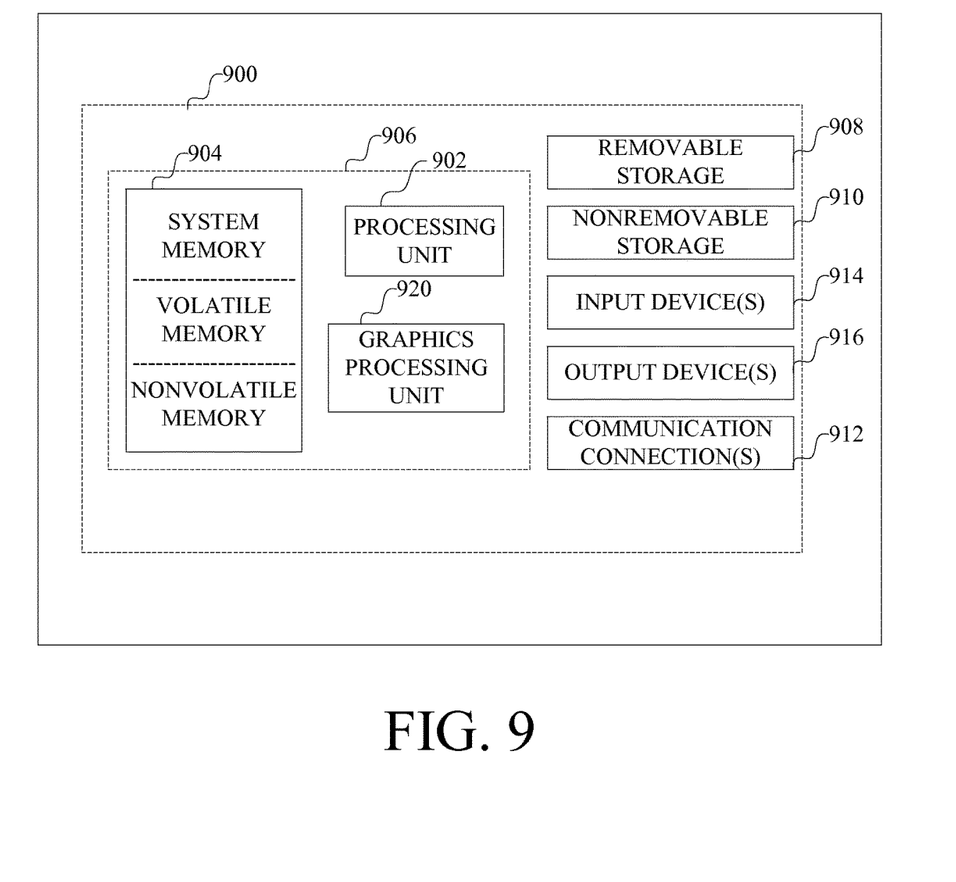
FIG. 9 is a block diagram of an example computer with which components of such a system can be implemented.

FIG. 9 illustrates an example of a suitable computer. This is only one example of a suitable computer and is not intended to suggest any limitation as to the scope of use or functionality of such a computer.

With reference to FIG. 9, an example computer 900, in a basic configuration, includes at least one processing unit 902 and memory 904. The computer may include multiple processing units and/or additional co-processing units such as graphics processing unit 920. Depending on the exact configuration and type of computer, memory 904 may be volatile (such as RAM), non-volatile (such as ROM, flash memory, etc.) or some combination of the two. This configuration is illustrated in FIG. 9 by dashed line 906.

Additionally, computer 900 may also have additional features/functionality. For example, computer 900 may also include additional storage (removable and/or non-removable) including, but not limited to, magnetic or optical disks or tape. Such additional storage is illustrated in FIG. 9 by removable storage 908 and non-removable storage 910. Computer storage includes volatile and nonvolatile, removable and non-removable storage implemented in any method or technology for storage of information such as computer program instructions, data structures, program modules or other data. Memory 904, removable storage 908 and non-removable storage 910 are all examples of computer storage. Computer storage includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other storage component which can be used to store the desired information and which can accessed by computer 900. Any such computer storage may be part of computer 900. Storage is any functional device into which data can be written to one or more physically-addressable components, retained at the one or more physically-addressable components and read from the one or more physically-addressable components.

Computer 900 may also contain communications connection(s) 912 that allow the device to communicate with other devices over a communication medium. Communication media typically transmit computer program instructions, data structures, program modules or other data in a modulated data signal such as a carrier wave or other transport mechanism and include any transmission media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 912 are devices that interface with the communication media to transmit data over and receive data from communication media, such as a network interface.

Computer 900 may have various input device(s) 914 such as a keyboard, mouse, pen, camera, touch input device, and so on. Output device(s) 916 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye , and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process performed by a processor in a computer, comprising:
    receiving, into memory, an indication of file objects, stored in computer storage and accessible by a first entity through a file system according to first permissions associated with the file objects, to be shared with one or more second entities;
    in response to an instruction to share the indicated file objects with the one or more second entities, generating a bundle object;
    storing data, for each of the indicated file objects to be shared, such that each of the indicated file objects includes an indication of whether the file object is part of a bundle object;
    storing data associated with the bundle object indicating second permissions for the one or more second entities for accessing the file objects associated with the bundle object;
    in response to a request associated with an entity to access one of the indicated file objects, determining whether access by the entity is permitted by the first permissions associated with the one of the indicated file objects;
    in response to determining that access by the entity is permitted by the first permissions, providing the requested access for the entity; and
    in response to determining that access by the entity is not permitted by the first permissions, determining whether the one of the indicated file objects is part of a bundle object based on the stored data for the one of the indicated filed objects and whether access to the one of the indicated file objects is permitted based on the bundle object.

2. The computer-implemented process of claim 1, wherein the second permissions indicate the one or more second entities permitted to access the shared objects.

3. The computer-implemented process of claim 1, wherein the bundle object is created outside of a file system name space for the first entity.

4. The computer-implemented process of claim 1, further comprising:
    in response to an entity from among the one or more second entities accessing an object associated with a bundle object, accessing the second permissions from the bundle object; and
    determining whether the entity has permission to access the object using the second permissions from the bundle object.

5. The computer-implemented process of claim 1, wherein the storing data indicating that the object is associated with the bundle object is performed without copying or moving the objects to be shared.

6. The computer-implemented process of claim 1, further comprising:
    presenting a user interface indicating, for the first entity, file objects shared by the first entity, the user interface indicating bundle objects associated with the first entity and file objects within the bundle objects.

7. The computer-implemented process of claim 1, further comprising:
    identifying objects shared with an entity by other entities.

8. An article of manufacture comprising:
computer storage, comprising at least one of a memory device or a storage device, with computer program instructions stored in the computer storage, such that the computer program instructions, when processed by a processing device, instruct the processing device to perform a process comprising:
receiving, into memory, an indication of file objects, stored in computer storage and accessible by a first entity through a file system according to first permissions associated with the file objects, to be shared with one or more second entities;
in response to an instruction to share the indicated file objects with the one or more second entities, generating a bundle object;
storing data, for each of the indicated file objects to be shared, such that each of the indicated file objects includes an indication of whether the file object is part of a bundle object;
storing data associated with the bundle object indicating second permissions for the one or more second entities for accessing the file objects associated with the bundle object;
in response to a request associated with an entity to access one of the indicated file objects, determining whether access by the entity is permitted by the first permissions associated with the one of the indicated file objects;
in response to determining that access by the entity is permitted by the first permissions, providing the requested access for the entity; and
in response to determining that access by the entity is not permitted by the first permissions, determining whether the one of the indicated file objects is part of a bundle object based on the stored data for the one of the indicated filed objects and whether access to the one of the indicated file objects is permitted based on the bundle object.

9. The article of manufacture of claim 8, wherein the second permissions indicate the one or more second entities permitted to access the shared objects.

10. The article of manufacture of claim 8, wherein the bundle object is created outside of a file system name space for the first entity.

11. The article of manufacture of claim 8, wherein the process performed by the processing device further comprises:
in response to an entity from among the one or more second entities accessing an object associated with a bundle object, accessing the second permissions from the bundle object; and
determining whether the entity has permission to access the object using the second permissions from the bundle object.

12. The article of manufacture of claim 8, wherein the storing data indicating that the object is associate with the bundle object is performed without copying or moving the selected file objects.

13. The article of manufacture of claim 8, wherein the process performed by the processing device further comprises:
presenting a user interface indicating, for a first entity, file objects shared by the first entity, the user interface indicating bundle objects associated with the first entity and file objects within the bundle objects.

14. The article of manufacture of claim 8, wherein the process performed by the processing device further comprises:
identifying objects shared with an entity by other entities.

15. A computer system comprising:
one or more server computers connected to one or more storage devices and accessible over a computer network by a plurality of client computers, through which users access the one or more server computers to store file objects in a file system maintained by the server computer for file objects stored on the one or more storage devices, the server computers being configured to:
receive, into memory, an indication of file objects, stored in computer storage and accessible by a first entity through a file system according to first permissions associated with the file objects, to be shared with one or more second entities;
in response to an instruction to share the file objects with the one or more second entities, generate a bundle object;
store data, for each of the indicated file objects to be shared, such that each of the indicated file objects includes an indication of whether the file object is part of a bundle object;
store data associated with the bundle object indicating second permissions for the one or more second entities for accessing the file objects associated with the bundle object;
in response to a request associated with an entity to access one of the indicated file objects, determining whether access by the entity is permitted by the first permissions associated with the one of the indicated file objects;
in response to determining that access by the entity is permitted by the first permissions, providing the requested access for the entity; and
in response to determining that access by the entity is not permitted by the first permissions, determining whether the one of the indicated file objects is part of a bundle object based on the stored data for the one of the indicated filed objects and whether access to the one of the indicated file objects is permitted based on the bundle object.

16. The computer system of claim 15, wherein the second permissions indicate the one or more second entities permitted to access the shared objects.

17. The computer system of claim 15, wherein the bundle object is created outside of a file system name space for the first entity.

18. The computer system of claim 15, wherein the server computers are further configured to, in response to an entity from among the one or more second entities accessing an object associated with a bundle object, access the second permissions from the bundle object, and determine whether the entity has permission to access the object using the second permissions from the bundle object.

19. The computer system of claim 15, wherein the server computers are further configured to present a user interface indicating, for the first entity, file objects shared by the first entity, the user interface indicating bundle objects associated with the first entity and file objects within the bundle objects.

20. The computer system of claim 15, wherein, to store the data indicating that the object is associated with the bundle object, the server computers are further configured to share selected file objects without copying or moving the selected file objects.

* * * * *